(12) United States Patent
Magerstedt et al.

(10) Patent No.: US 10,538,110 B2
(45) Date of Patent: Jan. 21, 2020

(54) METHOD AND SYSTEM FOR PRINTING CONTAINERS

(71) Applicant: KHS GmbH, Dortmund (DE)

(72) Inventors: Stefan Magerstedt, Dortmund (DE); Katrin Preckel, Gelsenkirchen (DE)

(73) Assignee: KHS GmbH, Dortmund (DE)

( * ) Notice: Subject to any disclaimer, the term of this patent is extended or adjusted under 35 U.S.C. 154(b) by 147 days.

(21) Appl. No.: 15/755,066

(22) PCT Filed: Jul. 28, 2016

(86) PCT No.: PCT/EP2016/068118
§ 371 (c)(1),
(2) Date: Feb. 24, 2018

(87) PCT Pub. No.: WO2017/032546
PCT Pub. Date: Mar. 2, 2017

(65) Prior Publication Data
US 2018/0250954 A1  Sep. 6, 2018

(30) Foreign Application Priority Data
Aug. 26, 2015  (DE) .................. 10 2015 114 172

(51) Int. Cl.
*B41J 3/407* (2006.01)
*B41J 3/54* (2006.01)
(Continued)

(52) U.S. Cl.
CPC ............ *B41J 3/4073* (2013.01); *B41J 3/543* (2013.01); *B65B 61/025* (2013.01); *B65B 61/26* (2013.01); *B65B 57/04* (2013.01); *B65C 9/04* (2013.01)

(58) Field of Classification Search
CPC ......... B41J 3/543; B41J 3/4073; B65B 57/04; B65B 61/025; B65B 61/26; B65C 9/04; B42D 57/04; G06K 19/06056
See application file for complete search history.

(56) References Cited

U.S. PATENT DOCUMENTS

| | | | |
|---|---|---|---|
| 5,570,632 A | 11/1996 | Cumens et al. | |
| 2013/0335783 A1 | 12/2013 | Kurtz et al. | |
| 2017/0313112 A1* | 11/2017 | Sonnauer | B41J 29/393 |

FOREIGN PATENT DOCUMENTS

| | | |
|---|---|---|
| CN | 101184629 | 5/2008 |
| CN | 102803079 | 11/2012 |

(Continued)

*Primary Examiner* — Leslie J Evanisko
*Assistant Examiner* — Marissa Ferguson-Samreth
(74) *Attorney, Agent, or Firm* — Occhiuti & Rohlicek LLP

(57) ABSTRACT

A printing method includes providing metadata, image information, and coding data. The method also includes, based at least in part on the metadata, selecting a local region at which the coding data is to be arranged in the image when the image is printed, generating coded printed-image information, and directly printing a printed image on the container based on the coded printed-image information. Generating the coded printed-image information includes modifying the printed-image information based on the coding data. A location of the printed-image information is selectively modified based at least in part on the selected local region. Metadata includes information representative of the container's geometry. The printed-image information includes data representing a printed image to be applied to the container. The coding data includes information to be applied to the container in steganographically-coded form.

20 Claims, 3 Drawing Sheets

(51) Int. Cl.
*B65B 61/02* (2006.01)
*B65B 61/26* (2006.01)
B65B 57/04 (2006.01)
B65C 9/04 (2006.01)

(56) References Cited

FOREIGN PATENT DOCUMENTS

| | | | | |
|---|---|---|---|---|
| CN | 104175727 | 12/2014 | | |
| CN | 104203583 | 12/2014 | | |
| DE | 10 2007 050 490 | 4/2009 | | |
| DE | 10 2013 213846 | 1/2015 | | |
| DE | 102013213846 | * 1/2015 | ............. | B41J 3/407 |
| EP | 2 537 767 | 12/2012 | | |
| JP | 2006-130895 | 5/2006 | | |
| WO | WO2005/000592 | 1/2005 | | |
| WO | 2013/023844 | 2/2013 | | |

* cited by examiner

METHOD AND SYSTEM FOR PRINTING CONTAINERS

RELATED APPLICATIONS

This application is the national stage of international application PCT/EP2016/068118, filed on Jul. 28, 2016, which claims the benefit of the Aug. 26, 2015 of German application DE 10-2015-114172.8, the contents of which are herein incorporated by reference.

FIELD OF INVENTION

The invention relates to container processing, and in particular, to printing on containers.

BACKGROUND

It is generally considered desirable to mark containers so that consumers will know what they contain. One way to mark a container is to apply a pre-printed label. The label in this case is attached by adhesive.

Another way to mark a container is to print directly on the container. This can be carried out using an inkjet printer. In such cases, a container is typically made to rotated as it is being printed upon.

An advantage of directly printing on a container is its flexibility. It is not difficult to reprogram a printer to accommodate short production runs, something that might be impractical with pre-printed labels.

SUMMARY

An object of the invention is to provide a method for container printing that can ensure traceability of containers.

In one aspect, the invention relates to a method for printing an image onto a container's wall using an inkjet print head. The method includes receiving printing metadata at a corresponding interface of a printing system. The printing metadata contain information about the geometry of the container that is to be printed upon. The geometry information contains data that represents the three-dimensional form of the container that is to be printed upon, including such features as grooves, beadings, bulges, bosses. It also includes information that influences printing parameters, such as the positioning of the printed image or coding data.

The method also includes providing first printed-image information containing data representative of an image that is to be printed on the container's surface. This first printed-image information can be made available as an image file, such as a pixel graphic file or a vector graphic file. Examples of suitable files include TIF, BMP, and JPG files. The first printed-image information preferably contains all of the information that is to be applied to the container so as to be visible to the naked human eye, including such features as text, images, barcodes or matrix codes, and the like.

The method also includes applying information encoded in coding data. Examples of such information include steganographically-coded information. This information is incorporated into the first printed-image information in such a way that it cannot be detected by a human observer.

However, other examples of coding data are not steganographically coded. Examples include tacking information, information about the bottling plant, information about the manufacturer, information about the customer, information about the printing ink batch, information about the print head, and information about the bottling date To ensure that the coding data can be ascertained and read quickly and easily from the printed image, the method includes selecting a local region in which the coding data is to be arranged on the container and/or in the printed image and doing so on the basis of the printing metadata. This local region can be defined either on the surface of the container or in the printed image itself. In other words, the reference for positioning the coding data is either the printed image or the container itself.

The printed image is often applied to the container so as to occupy a defined position relative to a container feature such as a boss. The position of the coding data on the container is therefore uniquely defined irrespective of the selected reference.

The method includes determining a local region, referred to hereafter as the code region, in which the container wall has as constant a form as possible, for example as constant a bulge as possible, and on which there is as constant a coloration as possible of the printed image. It is preferable that the first printed-image information also be used to select the local region so that a suitable code region can be determined. The suitable code region is one that has as constant a coloration or color distribution as possible.

The method then includes generating coded printed image information by modifying the first printed-image information based on the coding data. This includes selectively modifying a location on the printed image by modifying the first printed-image information based on the selected local region, or code region. Examples of modifying the first printed-image information include adding information steganographically.

In some practices, this results in modifying the printed image by modifying color values of individual dots of the first printed-image information based on the coding data. Among such practices are those that convert the coding data into a dot matrix and include the resulting dot matrix in the first printed-image information by selectively modifying color values of the first printed-image information at the dots of the dot matrix. Some practices include encoding the coding data through the position of the dots relative to each other.

Finally, the printing of the container is now carried out based on the coded printed image information by means of at least one print head in the direct printing method, i.e. the first printed-image information that has been steganographically modified based on the coding data is printed onto the container wall as a printed image. The printed image therefore contains a code with the coding data therein contained. In other words, the code is an integral part of the printed image.

The essential advantage of the inventive method lies in the fact that further data which cannot be perceived by a human observer but which can be utilized for the tracing of supply routes or of manufacturers or for identifying batches can be flexibly integrated into a printed image that is to be applied to the container. So for example any machine operator can incorporate its own coding data into the printed image, with the coding data being unchanging over time (e.g. manufacturer's code) or variable over time (batch number, bottling date etc.).

According to one embodiment the coding data are provided as second printed-image information and the coded printed image information is obtained by combining or superimposing the first and second printed-image information. The second printed-image information is contained for example in an image file, pixel graphic or a vector graphic and the coded printed image information is created by merging these two image files. In particular these can be TIF, BMP or JPG files. The merging or combining or superimposing can for example be accomplished in a data processing unit that is associated with the printing device. This achieves a chronological disconnect between on the one hand the generating of the first printed-image information which is produced a long time ahead by for example a service provider such as an advertising agency or a software supplier, and on the other the creation of the second printed-image information that is generated by the plant operator itself, for example only just prior to the container printing.

So as not to impair the optical appearance of the printed container, the coding data are preferably contained or integrated in the coded printed image information in such a way that they cannot be detected by the human eye without technical aids but can be seen and read out by a readout apparatus. As well as avoiding the optical impairment of the printed image, this ensures that any random third parties cannot read out the coding data because the latter cannot be detected without technical aids.

A steganographic code can sometimes be difficult to find. To promote the ease and rapidity of locating such a code, some practices define one or more code regions in the printed image in which the coding data will be located.

Among these practices are those that place the code at multiple locations. Such repetition makes it more likely that the coding data will be readable even if the printed image is damaged.

However, there remain practices that include placing the coding data to be present in only a single code region in the printed image.

The code region is preferably arranged at a defined site relative to a reference mark or to a reference position. Some practices include choosing the reference mark or the reference position to be an optically easily identifiable region feature. The feature can be a feature of the printed image or a feature inherent in the container, such as a bulge or a boss. In either case, these practices select a feature that is easy to locate. The defined offset can then be a defined angular offset and/or a longitudinal offset relative to the reference mark or reference position. Finding the code region is greatly simplified in this way.

Some practices include choosing, as a reference mark, a print mark or at least a part of a barcode, matrix code, or a two-dimensional code. Other features specific to the printed image can also be used as a reference mark.

Other practices include selecting the coded printed image information to be a dot matrix. In other words, the information contained in the coding data is converted to a dot matrix, with the information of the coding data being contained in the positions of the individual dots of the dot matrix relative to one another. This means that an unauthorized reader cannot readily reconstruct the coded information even after the dot matrix has been read.

Other practices include converting the coding data into pixels or pixel groups of a defined color that will substitute for selected pixels or pixel groups of the first printed-image information, preferably at a predetermined code region. The color of the pixels or pixel groups is selected so that they stand out sufficiently from the pixels surrounding them.

In alternative practices, color values of pixels or pixel groups of the first printed-image information are varied based on the coding data. Such practices include modifying pixels or pixel groups by a defined color value so that the pixels or pixel groups stand out from the pixels surrounding them. This facilitates reading the secure code.

Other practices include changing some of the pixels or pixel groups in the region of the barcode, matrix code, or two-dimensional code based on the coding data. Such practices include integrating the secure code into the barcode, matrix code, or two-dimensional code. Typically these barcodes, matrix codes, or two-dimensional codes comprise chromatically homogeneous surfaces, such as black bars or rectangles, into which the secure code is introduced. This too facilitates reading the secure code.

In some practices, the surface region in which certain pixels are to be modified has an area of less then five square millimeters. Among these are practices in which the area is less than one square millimeter. In yet other practices, the surface region is a square with ten pixels on a side. Using such a small surface region significantly reduces the visual obtrusiveness of the coding data.

In some practices, the printing metadata also has information about the color of the container wall that is to be printed upon, the size of the printed image that is to be applied, the color of the liquid filling-material, or any combination thereof. Taking such factors into account further enhances the readability of the coding data.

Other practices include selecting the local region to be in a region of the container's wall that is homogeneous in shape. This avoids having distortions undermine the ability to read the coding data.

In another aspect, the invention features an apparatus that carries out direct inkjet printing on the surface of a container. Such an apparatus includes a printing station having an inkjet print head and a controller for actuating the print head. The apparatus also includes an interface configured to receive printing metadata that contains information about the geometry of the container that is to be printed, upon, an interface configured to receive printed image information that contains data representative of a printed image to be applied to the container, an interface configured to receive coding data that is to be applied to the container in steganographically coded form, and a data-processing unit that is configured to use the printing metadata for selecting a local region on which to arrange the coding data in the printed image or on the container and to generate coded printed image information by modifying the first printed-image information based on the coding data, with locations defined by the first printed-image information being selectively modified based on the selected local region. The controller configured so as to actuate the print head based on the coded printed-image information in order to print, upon the container's surface, a printed image which contains the coding data.

As used herein, "container" refers to all containers, in particular bottles and cans. However, a "container" can also be a pouch.

As used herein, the expressions such as "substantially" or "around" refer to variations from an exact value by ±10%, preferably by ±5% and/or variations in the form of changes insignificant for function.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

These and other features of the invention will be apparent from the following detailed description and the accompanying figures, in which;

DETAILED DESCRIPTION

Figure 1:
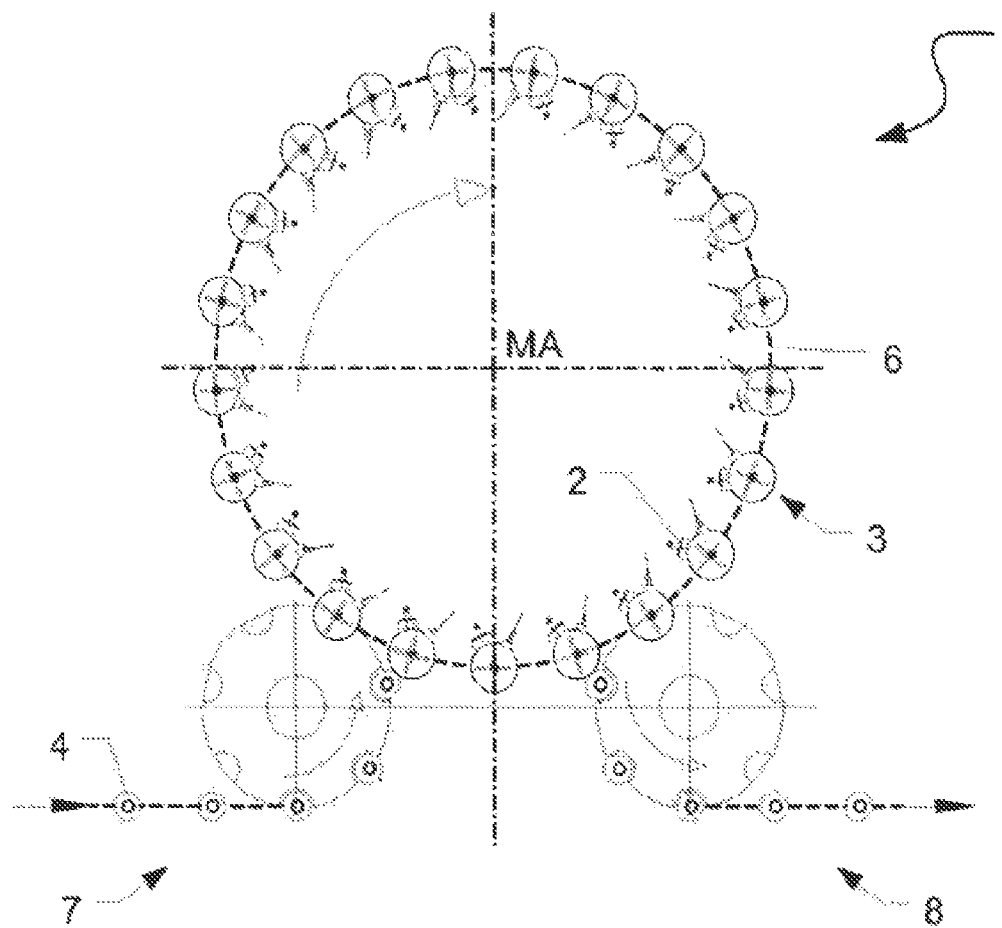
FIG. 1 shows a plan view of a printing device.

FIG. 1 shows a rotary printing machine 1 for printing an image on bottles or similar containers. The printing device 1 comprises a rotor 6 that rotates around a machine axis MA. Containers 4 to be printed upon are fed to the printing stations 3 through a container entry 7. During printing, each container stands with its container axis parallel to the machine axis MA and rotates about its container axis. Upon being printed upon during rotation of the rotor 6, the containers 4 are removed from the printing station 3 at a container exit 8.

Mounted on the rotor's periphery are printing stations 3. Each printing station 3 has an inkjet print head 2 that moves with the printing station 3. The inkjet print head 2 has jets arranged in an array of rows, each being electrically controllable. Directly printing on a container 4 involves actuating a piezoelectric element or electrode to eject ink towards the container 4.

In the process of printing an image, the printing station 3 also applies coding data to the container 4. This coding data makes it possible to reproduce and track the supply path of an individual container 4. Examples of coding data include information indicative of filling date and time, an identification string that encodes, for example, a container-treatment plant, an ink batch, an ink-tank number, a print-head identifier, or a customer identifier. The identification string can also be a security number or a code number.

The coding data is steganographically integrated into the image during printing thereof to form the printed image. In particular first printing-image information, or "first image-information," is modified so that the integration of the coding data into the image once it has been printed cannot be detected without technical aids. Some practices use a separate code to integrate the coding data into the image. In these practices, the result is a secure code formed by integrating the coding data into the image in coded form.

Figure 2:
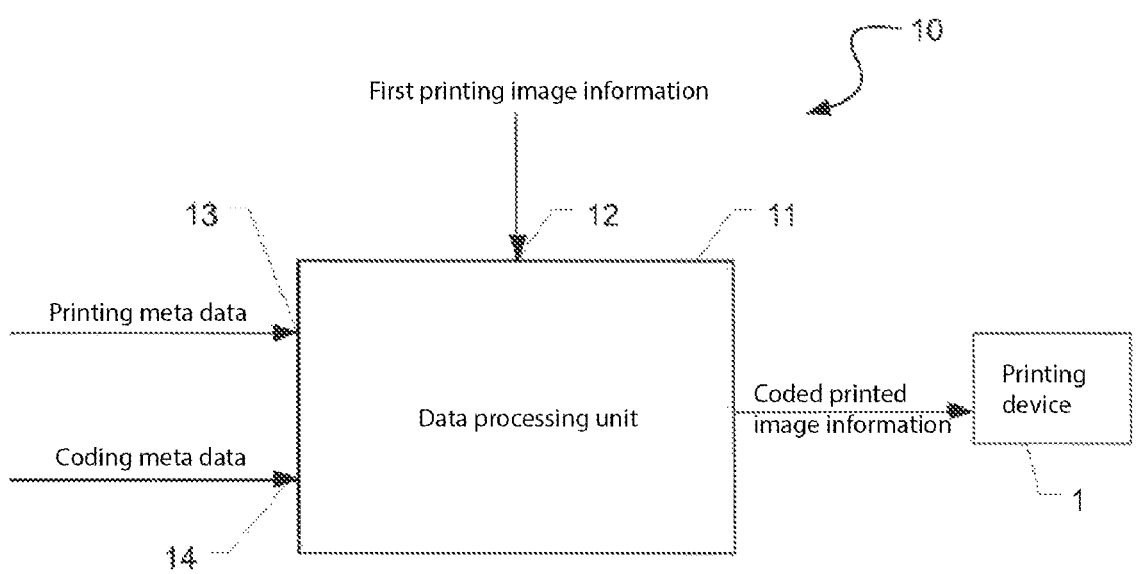
FIG. 2 shows a block diagram of a printing system.

FIG. 2 shows a system 10 for integrating coding data into an image that a printing device 1 ultimately prints on a container 4. The system 10 comprises a data-processing unit 11 that integrates the coding data into the printed image.

The data-processing unit 11 receives first image-information through a first interface 12, printing metadata through a second interface 13, and coding metadata through a third interface 14. However, in some embodiments, all the data is provided through a single interface.

The first image-information contains data about the printed image that is to be applied to the container 4. In some embodiments, the system 10 receives an image file that includes the first image-information. In other embodiments, the system 10 receives a vector-graphic file that includes the first image-information.

The printing metadata contains information that is important for preparing for and carrying out the printing operation. Examples of such information include, without limitation, information concerning placement of the printed image on the container, information concerning alignment of the printed image relative to features on the container, information concerning the printed image's size, and information about the geometry or form of the container, and in particular, the three-dimensional form of the container.

The printing metadata is thus useful for enabling the secure code to be placed so that it can more easily be recognized and read. The printing metadata can thus be used, for example, to ensure that the container 4 is printed upon at a region that is relatively homogeneous and that does not have structures such as grooves, bosses, or beads that might interfere with recognition and reading of the secure code or the coding data.

The data-processing unit 11 creates coded image information based on the first image-information, the printing metadata, and the coding metadata. The resulting image contains information that is visible to the human eye and coding data in coded form that is steganographically included in the printed image. As used herein, "steganographic" means that the coding data has been integrated into the image in such a way that its existence is not apparent to the human consumer or buyer who has no advance knowledge of its existence.

Software controls the actual location of the coding data within the image. In some practices, the choice of location is carried out automatically. In other embodiments, the software offers a selection of local regions from which a machine operator selects.

In selecting a local region, it is prudent to consider the three-dimensional form of the container 4 that is to be printed upon. Doing so will prevent the secure code from ending up in a local region in which there are distortions due to indentations or bulges in the container's wall.

In some embodiments, the data processing unit 11 uses the image information to select a local region having homogeneous colors. Doing so will promote readability of the secure code.

In some embodiment, an array of dots forms the secure code. These dots, referred to here as "security dots," are integrated into the printed image. The combination of the image and the security dots thus forms the coded image.

Each security dot is a pixel or a group of pixels. The security dots thus form a dot cloud or a dot matrix in which the disposition of security dots relative to each other defines coded information.

In some practices, the security dots have a defined color. These security dots replace pixels or pixel groups in the image information. In some cases, this occurs when the security code is placed at a position within the printed image that has a homogeneous color that differs from that of the security dots.

Alternatively, the security dots are integrated into the image information by color values of pixels or pixel groups, with the image information being altered based on the coding data to yield a dot cloud of locally distributed security dots having varied color values.

Depending on the printing metadata or on the image information, the secure code can also be arranged in the region of a barcode, a matrix code, or a two-dimensional code. This makes it easier to find the secure code. Additionally, such regions often have homogeneous coloring, which is advantageous for arranging a secure code.

Some embodiments arrange the secure code a locally very limited region of the container's surface. In some cases, the area of this region comprises just a few square millimeters. Among these are embodiments in which the area is less five square millimeters, embodiments in which the area is less than two square millimeters, embodiments in which the area is less than one square millimeter, and embodiments in which the area is a square with ten pixels on a side, which would typically come to seven tenths of a square millimeter.

In some embodiments, the colors of the individual dots of the secure code differ slightly from the background color of the region of the printed image by an extent that is sufficient to ensure detectability even after it has faded somewhat from exposure to ultraviolet light but not so apparent that the color difference will be obtrusive to the consumer.

In some embodiments, the first printed-image information is in a first printed image file. Examples of such files are image files and vector graphic files.

In some cases, the coding data is converted into second printed-image information. As was the case for the first printed-image information, the second printed-image information can again be an image file or a vector graphic file. A suitable coding algorithm converts the coding data into a secure code, and in particular to a steganographic code.

The steganographic code can be contained within the second printed-image information, which already contains the secure dots. Combining or superimposing the first and second printed-image information thus yields the coded printed image information. An image-processing program is generally capable of carrying out such a merger of printed image information and the coded printed image information.

For multi-colored images, the first printed-image information can take the form of multiple files. In such cases, each file contains information about the local application of a particular color for creating the printed image. This organization makes it possible to generate the first printed-image information and to carry out the integration of the coding data into the printed image at separate times. As an example, a service provided can generate the first printed-image information in advance while a bottler or manufacturer generates the second printed-image information and combines it with the given first printed-image information to form the combination or superposition of the first and second image information. This permits constantly changing data to be steganographically integrated into the image with a minimum of extra time and cost. Such constantly changing information can include, for example, production-dependent data.

Some practices of the printing process print the secure code is at a defined place in the printed image and only at a single place in the printed image. In other words, there is no repetition of the secure code at different places.

Other practices print the secure code at two or more different places in the printed image. This creates redundancy that promotes the ability to read the secure code if the printed image is damaged.

Some practices of the printing process arrange the secure code within a defined code region that occupies a fixed position relative to a point-of-reference. The point-of-reference can be any feature of the container or printed image that is optically detectable. Examples of a point-of-reference include a print mark, a part of a barcode or two-dimensional code, a boss that results from an embossing, or any other optically recognizable marking. Examples of these practices are those that place the secure code relative to a feature of the container, for example offset by a defined distance. Doing so makes the secure code more easily located.

Figure 3:
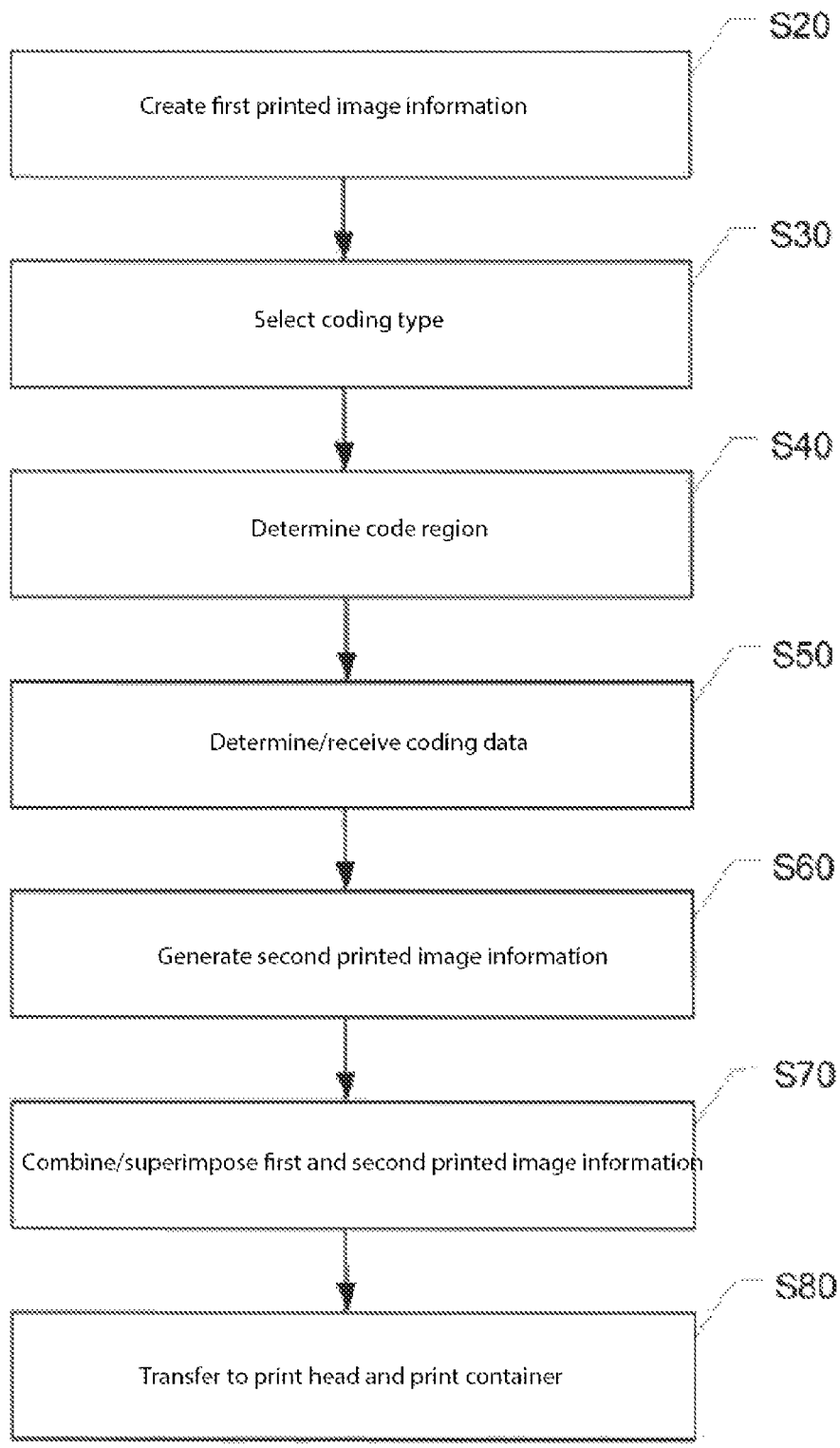
FIG. 3 shows a flowchart of a method for printing on container with a printed image containing steganographically-coded information.

FIG. 3 shows a block diagram of a method for direct printing on a container 4. The process begins with a first step S20 of generating the first printed image information. This first step includes taking into consideration printing metadata that is at least partially identical with the printing metadata used to place the secure code in the printed image. For example, the position of the printed image on the container 4 and/or the size of the printed image is decided before the first printed-image information is created. Furthermore, either the color of the container wall or the color of the liquid filling-material can be taken into consideration when creating the first printed-image information. The creation of the first printed-image information CAN also be based on geometrical information of the container 4, for example three-dimensional data that reflects its exact geometry. Based on this geometrical information, the first printed-image information can be selected to avoid printing on such structures as grooves, depressions, and bosses that would distort details of the printed image.

A second step S30 of selecting a particular coding type is then carried out in those cases in which different coding types are available for converting the coding data, into a secure code. In some practices, the second step S30 includes replacing regions of an image, or selected pixels in that image, by secure dots. In other practices, the second step S30 includes suitably altering color values of pixels that correspond to the locations of the secure dots. The particular coding type selected in the second step S30 can in some cases be influenced by whether the secure code is introduced into the printed image itself rather than into a barcode, a matrix code or two-dimensional code.

A third step S40 includes determining the code region, which is the actual site at which the secure code is to be integrated into the printed image. The characteristics of this code region promote the ease with which the secure code is located and recognized. One way to promote this is to choose the code region to be at a site having a relatively homogeneous color. Another way to promote this is to choose a code region that avoids grooves, beadings, bulges, or other container features that would likely distort the code region and thus interfere with recognition of the secure code.

A fourth step S50 includes determining or receiving coding data.

A fifth step S60 includes generating second printed-image information. The second printed-image information can also be generated as a plurality of parts of printed image information, with each part of the printed image comprising a particular color (e.g. cyan, magenta and yellow) and a desired color of the secure code resulting from the superposition of the parts.

A sixth step S70 that follows is that of combining or superposing the first and second printed-image information is effected. This results in the coded printed image. Here again, a plurality of first and second parts of printed image information can be combined and/or superimposed, and, after the superposition, the resulting parts of printed image information can be used to operate the print heads 2 for a particular color.

Finally, in a seventh step S80, the coded printed image information or printed image information derived therefrom is transmitted to the respective print heads 2 of the printing device 1 for the container printing to be carried out on that basis.

The invention has been described hereinbefore by reference to embodiments. It goes without saying that variations or modifications are possible without departing from the inventive concept underlying the invention.

The invention claimed is:

1. A method comprising printing an image on a container's surface, wherein printing said image comprises providing printing metadata, providing first printed image information, providing coding data, based at least in part on said printing metadata, selecting a local region at which said coding data is to be arranged in said image when said image is printed upon said container, generating coded printed image information, and using at least one print head, directly printing a printed image on said container based on said coded printed image information, wherein generating said coded printed image information comprises modifying said first printed image information based on said coding data, wherein a location of said first printed image information is selectively modified based at least in part on said selected local region, wherein said printing metadata includes information representative of the geometry of said container to be printed upon, wherein said first printed image information includes data representative of a printed image to be applied to said container, and wherein said coding data includes information to be applied to said container in steganographically coded form at at least one code region.

2. The method of claim 1, further comprising making said coding data available as second printed image information and obtaining said coded printed image information by combining said first and second printed image information.

3. The method of claim 1, further comprising causing said coding data to be steganographically embedded in said coded printed image information.

4. The method of claim 1, further comprising determining a location of said at least one code region based at least in part on said printing metadata.

5. The method of claim 1, further comprising causing said coding data to be present in at most one code region and determining said location based at least in part on said printing metadata.

6. The method of claim 1, further comprising causing said at least one code region to be arranged at a defined site relative to a reference mark.

7. The method of claim 1, further comprising causing said at least one code region to be arranged at a defined site relative to a reference mark selected from the group consisting of a barcode, a matrix code, and a two-dimensional code.

8. The method of claim 1, further comprising encoding said coding data as a dot matrix.

9. The method of claim 1, wherein modifying said first printed image information based on said coding data comprises converting said coding data into pixels having a defined color and replacing selected pixels in said first printed image information with said pixels having said defined color.

10. The method of claim 1, wherein modifying said first printed image information based on said coding data comprises converting said coding data into pixels having a defined color and replacing selected pixels in said first printed image information with said pixels having said defined color, said defined color is based at least in part on said coding data.

11. The method of claim 1, further comprising causing said at least one code region to be arranged at a defined site relative to a barcode and modifying pixels in said bar code based on said coding data.

12. The method of claim 1, wherein modifying said first printed image information based on said coding data comprises modifying pixels within a surface region having an area that is less than five square millimeters.

13. The method of claim 1, further comprising including, within said printing metadata, information indicative of a color of a container wall of said container that is to be printed upon.

14. The method of claim 1, further comprising selecting said local region so that said coding data is arranged in a homogeneously-shaped region of said container wall.

15. The method of claim 1, further comprising making said coding data available as second printed image information and obtaining said coded printed image information by superimposing said first and second printed image information.

16. The method of claim 1, further comprising causing said at least one code region to be arranged at a defined site relative to a reference position.

17. The method of claim 1, wherein modifying said first printed image information based on said coding data comprises modifying pixels within a surface region having an area that is less than one square millimeter.

18. The method of claim 1, further comprising including, within said printing metadata, information indicative of a color of liquid filling-material within said container that is to be printed upon.

19. The method of claim 1, further comprising causing said at least one code region to be arranged at a defined site relative to a matrix code and modifying pixels in said matrix code based on said coding data.

20. An apparatus for directly printing upon a surface of a container, said apparatus comprising a first interface, a second interface, a third interface, a data-processing unit, a controller, and at least one printing station having at least one print head, wherein said first interface is configured to receive printing metadata that includes information about the geometry of a container that is to be printed upon, wherein said second interface is configured to receive first printed image information that includes data representative of a printed image to be applied to said container, wherein said third interface is configured to receive coding data that is to be applied to said container in steganographically coded form, wherein said data-processing unit is configured to use said printing metadata for selecting a local region on which said coding data is to be arranged in a printed image on said container and for generating coded printed image information by modifying said first printed image information based at least in part on said coding data and on said selected local region, and wherein said controller is configured to actuate said print head based at least in part on said coded printed image information and to print, upon said container, a printed image that contains said coding data.

* * * * *